Patented Jan. 24, 1939

2,144,992

UNITED STATES PATENT OFFICE 2,144,992

MORDANT AZO DYESTUFFS AND A PROCESS FOR MAKING SAME

Max Müller, Basel, Switzerland, assignor to the firm Durand & Huguenin S. A., Basel, Switzerland No Drawing. Application January 3, 1938, Serial No. 183,229. In Germany January 15, 1937

13 Claims. (Cl. 260—187)

The present invention relates to new mordant azo dyestuffs corresponding to the general formula

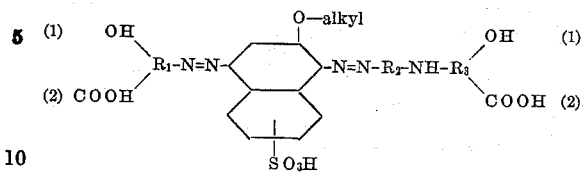

wherein $R_1$ represents a compound of the benzene series, $R_2$ an amino-naphthol radical and $R_3$ stands for an aromatic radical of the benzene series, and to the manufacture of such dyestuffs consisting in coupling the diazo compound of an aromatic amine, which contains a hydroxy group and a carboxylic group in ortho-position to one another, with a sulphonated alkyl-ether of 1-amino-2-hydroxy-naphthalene, further diazotizing and finally coupling with a component having a hydroxy group and a carboxylic group in ortho-position to each other.

The new dyestuffs are especially suitable for chrome mordanting on cotton and have very good fastness, particularly to washing.

The following examples illustrate the invention, the parts being by weight:

Example 1

23.3 parts of para-amino-ortho-sulpho-salicylic acid (OH, COOH, NH₂, SO₃H=1,2,4,6) are diazotized with 6.9 parts of sodium nitrite in the usual manner and the diazo compound is coupled in acetic acid solution with 26.7 parts of 1-amino-2-naphtholethylether-6-sulphonic acid. The amino-azo-dyestuff thus formed is filtered, dissolved in the necessary quantity of sodium carbonate in aqueous solution, the solution is mixed with 6.9 parts of sodium nitrite and there are stirred into it at 15–20° C. 80 parts of hydrochloric acid of 30 per cent strength. The orange-brown diazo compound is at once precipitated; it is filtered, made into a paste with water, and introduced into a solution of 51.9 parts of the condensation product of 1-amino-8-naphthol-3:6-disulphonic acid with salicyl sulpho-chloride, the solution having been first neutralized with sodium carbonate and then mixed with 100 parts of pyridine. When coupling is complete, the dyestuff is precipitated by acidification and converted into an alkali salt in the usual manner and finally dried.

When chrome printed on cotton, the dyestuff yields a vivid somewhat bluish-green of very good fastness.

If in this example the condensation product of 1-amino-8-naphthol-4:6-disulphonic acid and salicyl sulpho-chloride or the condensation product of 1-amino-8-naphthol-4-sulphonic acid and salicyl sulpho-chloride are used as the end component, there are obtained dyestuffs of similar properties.

Instead of 1-amino-2-naphthol-ethyl-ether-6-sulphonic acid there may be used with similar result 1-amino-2-naphthol-methyl-ether-6-sulphonic acid.

Example 2

23.3 parts of ortho-amino-para-sulphosalicylic acid (OH, COOH, SO₃H, NH₂=1,2,4,6) are diazotized with 6.9 parts of sodium nitrite and coupled in acetic acid solution with 26.7 parts of 1-amino-2-naphthol-ethyl-ether-6-sulphonic acid. For the rest, the process is the same as is described in Example 1.

There is obtained a dyestuff which yields, when chrome printed on cotton, greenish-blue tints of good properties of fastness.

Example 3

27.2 parts of para-amino-benzoyl-para-aminosalicylic acid are diazotized in the usual manner and the diazo compound which separates is filtered and then coupled in acetic acid solution with 26.7 parts of 1-amino-2-naphthol-ethyl-ether-6-sulphonic acid. The amino-azo-dyestuff is, as described in Example 1, indirectly further diazotized, this diazo compound being isolated and introduced into a solution of 51.9 parts of the condensation product of 1-amino-8-naphthol-3:6-disulphonic acid with salicyl sulpho-chloride in 180 parts of water, the solution having been first neutralized with sodium carbonate and then mixed with 100 parts of pyridine. The dyestuff is isolated in the usual manner in the form of its sodium salt.

When chrome printed on cotton, it yields a blue-green of good properties of fastness.

Instead of para-aminobenzoyl-para-aminosalicylic acid there may be used with similar result one of the following compounds: para-aminobenzoyl-ortho-amino-salicylic acid, para-aminobenzoyl-ortho-aminosulphosalicylic acid, para-aminobenzoyl-para-aminosulphosalicylic acid, meta-aminobenzoyl-para-aminosalicylic acid, as well as one of the corresponding cresotinic acid derivatives.

*Example 4*

15.3 parts of para-amino-salicylic acid are diazotized in the usual manner and coupled in acetic acid solution with 26.7 parts of 1-amino-2-naphtholethyl-ether-6-sulphonic acid. The amino-azo-dyestuff thus formed is further diazotized and coupled with a solution of 37.5 parts of 2-(4'-hydroxy-5'-carboxylphenyl)-amino-5-naphthol-7-sulphonic acid in 200 parts of water and 100 parts of pyridine. The dyestuff is isolated in the usual manner in the form of its sodium salt.

When chrome printed on cotton, it yields a blue-green of good fastness to washing.

*Example 5*

33.7 parts of 3-amino-4-sulphobenzene-azo-salicylic acid are diazotized in aqueous suspension in presence of 30 parts of hydrochloric acid of 33 per cent strength with 6.9 parts of sodium nitrite. The sparingly soluble diazo compound is filtered and coupled in acetic acid solution with 26.7 parts of 1-amino-2-naphthol-ethyl-ether-6-sulphonic acid. When coupling is complete, the amino-azo-dyestuff is precipitated by adding hydrochloric acid, filtered off, dissolved in the necessary concentrated sodium carbonate with water and further diazotized in the usual manner. This diazo compound is further isolated and introduced into a solution of 51.9 parts of the condensation product of 1-amino-8-naphthol-3:6-disulphonic acid with salicyl sulpho-chloride, which has been first neutralized with sodium carbonate and then mixed with 100 parts of pyridine. The dyestuff is isolated in the usual manner in the form of its sodium salt and dried.

When chrome printed on cotton, the dyestuff yields a bluish-green of good properties of fastness.

What I claim is:

1. A process of preparing mordant azo dyestuffs, corresponding to the general formula

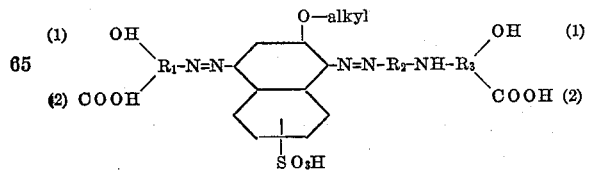

wherein R₁ represents a benzenic radical containing at least one benzene nucleus, R₂ a sulphonated hydroxy-naphthalene radical and R₃ stands for an aromatic radical of the benzene series, said process comprising coupling a diazo-component obtained from an amine of the benzene series, bearing a hydroxy- and a carboxylic group in ortho-position to each other, with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

2. A process of preparing mordant azo dyestuffs, corresponding to the general formula

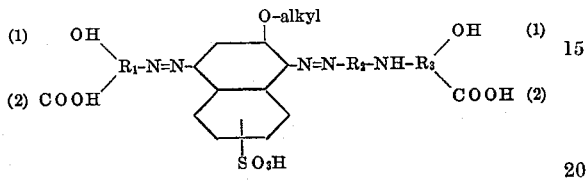

wherein R₁ represents a benzoylaminobenzene radical, R₂ a sulphonated hydroxynaphthalene radical and R₃ stands for an aromatic radical of the benzene series, said process comprising coupling the diazo-component obtained from an amino-benzoylaminobenzene compound bearing a hydroxy- and a carboxylic group in ortho-position to each other, with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

3. A process of preparing mordant azo dyestuffs, corresponding to the general formula

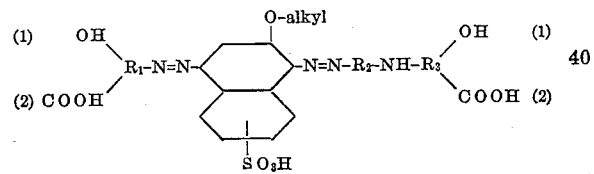

wherein R₁ represents a benzeneazo-benzene radical, R₂ a sulphonated hydroxynaphthalene radical and R₃ stands for an aromatic radical of the benzene series, said process comprising coupling the diazo-component obtained from an amino-benzeneazo-benzene compound bearing a hydroxy- and a carboxylic group in ortho-position to each other, with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

4. A process of preparing mordant azo dyestuffs, corresponding to the general formula

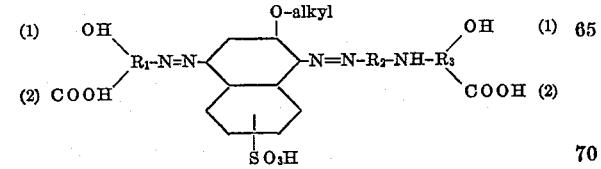

wherein R₁ represents a benzene radical, R₂ a sulphonated hydroxynaphthalene radical and R₃ stands for an aromatic radical of the benzene series, said process comprising coupling the diazo-component obtained from an amino-salicylic acid with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

5. A process of preparing mordant azo dyestuffs, corresponding to the general formula

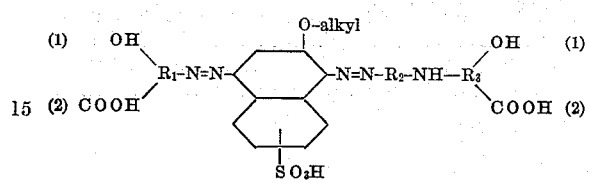

wherein $R_1$ represents a sulphonated benzene radical, $R_2$ a sulphonated hydroxynaphthalene radical and $R_3$ stands for an aromatic radical of the benzene series, said process comprising coupling the diazo-component obtained from a sulphonated aminosalicylic acid with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

6. A process of preparing mordant azo dyestuffs, corresponding to the general formula:

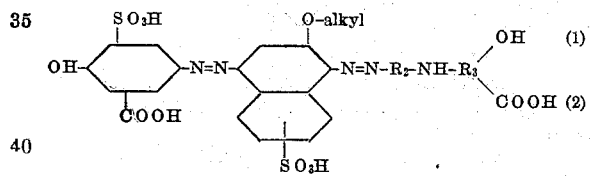

wherein $R_2$ represents a sulphonated hydroxy-naphthalene radical and $R_3$ stands for an aromatic radical of the benzene series, said process comprising coupling the diazo-component obtained from para-amino-ortho-sulpho-salicylic acid (OH, COOH, $NH_2$, $SO_3H$ = 1,2,4,6) with a sulphonated 1-amino-2-hydroxy-naphthalene-alkyl-ether, diazotizing the amino compound thus obtained and coupling finally with a sulphonated amino-naphthol substituted in the amino-group by an aromatic radical of the benzene series bearing a hydroxy- and a carboxylic group in ortho-position to each other.

7. A process of preparing mordant azo dyestuffs, corresponding to the general formula

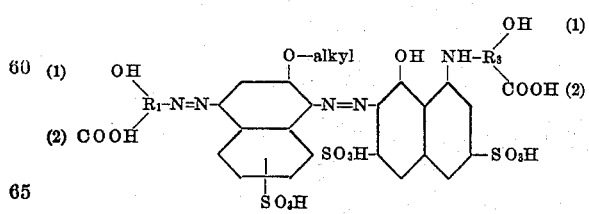

wherein $R_1$ represents a benzenic radical containing at least one benzene nucleus and $R_3$ stands for an aromatic radical of the benzene series, said process comprising coupling a diazo-compound obtained from an amine of the benzene series, bearing a hydroxy- and a carboxylic group in ortho-position to each other, with a sulphonated 1-amino-2-hydroxy-naphthalene-alkyl-ether, diazotizing the amino-compound thus obtained and coupling finally with 1-amino-8-naphthol-3:6-disulphonic acid substituted in the amino-group by an aromatic radical of the benzene series bearing a hydroxy- and a carboxylic group in ortho-position to each other.

8. A process of preparing mordant azo dyestuffs, corresponding to the general formula

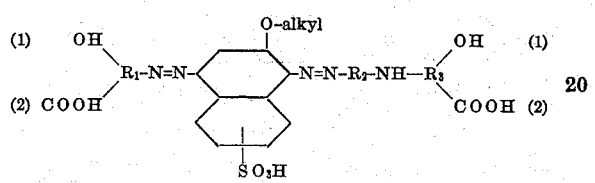

wherein $R_1$ represents a benzenic radical containing at least one benzene nucleus, $R_2$ a sulphonated hydroxy-naphthalene radical and $R_3$ stands for a benzene radical, said process comprising coupling a diazo-component obtained from an amine of the benzene series, bearing a hydroxy- and carboxylic group in ortho-position to each other, with a sulphonated 1-amino-2-hydroxy-naphthalene-alkyl-ether, diazotizing the amino-compound thus obtained and coupling finally with a sulphonated amino-naphthol substituted in the amino-group by a benzene radical bearing a hydroxy- and a carboxylic group in ortho-position to each other.

9. A process of preparing mordant azo dyestuffs, corresponding to the general formula

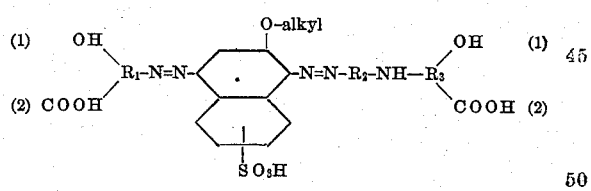

wherein $R_1$ represents a benzenic radical containing at least one benzene nucleus, $R_2$ a sulphonated hydroxy-naphthalene radical and $R_3$ stands for —$SO_2$—aryl—, said process comprising coupling a diazo-component obtained from an amine of the benzene series, bearing a hydroxy- and a carboxylic group in ortho-position to each other, with a sulphonated 1-amino-2-hydroxy-naphthalene-alkyl-ether, diazotizing the amino compound thus obtained and coupling finally with a sulphonated amino-naphthol substituted in the amino-group by an —$SO_2$—aryl—ortho-hydroxycarboxylic radical.

10. A process of preparing mordant azo dyestuffs, corresponding to the general formula

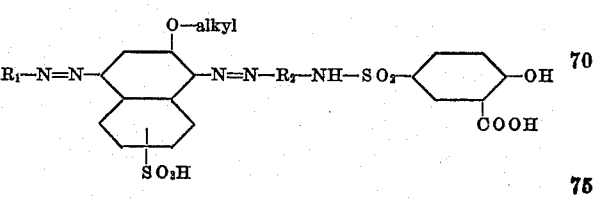

wherein $R_1$ represents a benzenic radical containing at least one benzene nucleus and $R_2$ a sulphonated hydroxynaphthalene radical, said process comprising coupling a diazo-component obtained from an amine of the benzene series, bearing a hydroxy- and a carboxylic group in ortho-position to each other, with a sulphonated 1-amino-2-hydroxy-naphthalene-alkyl-ether, diazotizing the amino compound thus obtained and coupling finally with a sulphonated aminonaphthol substituted in the amino-group by a salicyclic acid para-sulphochloride radical.

11. A process of preparing a mordant azo dyestuff, corresponding to the following formula

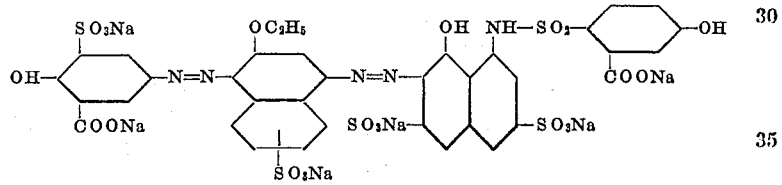

comprising coupling the diazo-compound obtained from para-amino-ortho-sulphosalicylic acid (OH, COOH, $NH_2$, $SO_3H$=1,2,4,6) with 1-amino-2-naphthol-ethylether-6-sulphonic acid, diazotizing the amino-compound thus obtained and coupling finally with the condensation product from 1-amino-8-naphthol-3:6-disulphonic acid and salicylic acid-para-sulphochloride.

12. Mordant azo dyestuffs, corresponding to the following general formula

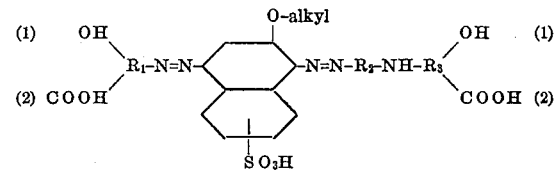

wherein $R_1$ represents a benzenic radical containing at least one benzene nucleus, $R_2$ a sulphonated hydroxynaphthalene radical and $R_3$ stands for an aromatic radical of the benzene series, said dyestuffs yielding in form of their alkali salts, when printed on cotton together with a chromium mordant, bluish-green shades having very good fastness, particularly to washing.

13. The mordant azo dyestuff corresponding in form of its sodium salt to the following formula

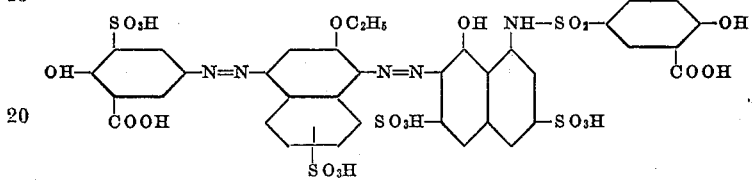

said dyestuff yielding, when chrome printed on cotton, a vivid bluish-green shade of very good fastness.

MAX MÜLLER.